(12) United States Patent
Acharya et al.

(10) Patent No.: US 10,242,100 B2
(45) Date of Patent: *Mar. 26, 2019

(54) MANAGING CACHED DATA IN A NETWORK ENVIRONMENT (71) Applicant: Amazon Technologies, Inc., Reno, NV (US)

(72) Inventors: Prashanth A. Acharya, Bellevue, WA (US); Ronald James Snyder, Jr., Everett, WA (US); Ryan F. Watson, Seattle, WA (US); Jonathan B. Corley, Seattle, WA (US); Nathan Alan Dye, Seattle, WA (US); Craig W. Howard, Seattle, WA (US); Harvo R. Jones, Seattle, WA (US); John K. Loendorf, Mercer Island, WA (US); Bradley E. Marshall, Bainbridge Island, WA (US); Imran Patel, Bellevue, WA (US); Lee B. Rosen, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/803,553

(22) Filed: Nov. 3, 2017

(65) Prior Publication Data
US 2018/0060431 A1 Mar. 1, 2018

Related U.S. Application Data (63) Continuation of application No. 13/372,349, filed on Feb. 13, 2012, now Pat. No. 9,811,590.

(51) Int. Cl.
G06F 17/30 (2006.01)
H04L 29/08 (2006.01)

(52) U.S. Cl.
CPC .... *G06F 17/30861* (2013.01); *G06F 17/3089* (2013.01); *H04L 67/2852* (2013.01); *H04L 29/0809* (2013.01)

(58) Field of Classification Search
CPC .......... G06F 17/30861; G06F 17/3089; H04L 29/0809
See application file for complete search history.

(56) References Cited

U.S. PATENT DOCUMENTS

| 8,224,964 B1 * | 7/2012 | Fredrickson | ...... H04L 29/08729 709/227 |
| 2009/0217301 A1 * | 8/2009 | Grant | ...................... G06F 21/31 719/320 |

(Continued)

OTHER PUBLICATIONS

Jeffrey C. Mogul, Potential benefits of delta encoding and data compression of HTTP, Dec. 1997, AT&T Labs, pp. 1-40.*

(Continued)

*Primary Examiner* — Eric Cardwell
(74) *Attorney, Agent, or Firm* — Seed IP Group LLP (57) ABSTRACT Techniques are described for managing cached data in a network environment. In one example, the techniques include receiving a client request for a data group, determining that a cached copy of the requested data group that is stored in the persistent cache storage is no longer valid relative to a current copy of the data group stored at a remote data source system, obtaining from the remote data source system information about differences between the cached copy and the current copy and instructions associated with the identified differences, modifying, by the configured server computing system, the cached copy to include the identified differences in accordance with the received instructions, and providing, by the configured server computing system, the modified cached copy of the requested data group to the client in response to the client request.

19 Claims, 6 Drawing Sheets (56) References Cited

U.S. PATENT DOCUMENTS

2011/0055683 A1    3/2011    Jiang
2011/0137973 A1*  6/2011    Wei et al. .................... 709/202
2012/0066493 A1    3/2012    Widergren et al.

OTHER PUBLICATIONS

Fielding, R., et l., "Hypertext Transfer Protocol—HTTP/1.1," Jun. 1999, retrieved on Feb. 13, 2012, from http://www.ietf.org/rfc/rfc2616.txt, 157 pages.

Mogul, J., et al., "Potential benefits of delta encoding and data compression of HTTP," Dec. 1997, AT&T Labs, pp. 60 pages.

MacKenzie, D., et al., "Comparing and Merging Files Diff, Diff3, sdiff, cmp, and patch," Sep. 1993, edition 1.3, section Making Edit Scripts, https://www.slac.stanford.edu/comp/unix/gnu-info/diff_toc.html, 3 pages.

Ss64, Diff manual page, Archived Feb. 12, 2003, retrieved from, https://web.archive.org/web/20030212193349/http://www.ss64.com/bash/diff.html, 14 pages.

* cited by examiner

MANAGING CACHED DATA IN A NETWORK ENVIRONMENT

BACKGROUND

In a network environment, in order to reduce bandwidth usage, server load, and data delivery lag, data may be temporarily stored ("cached") by various types of systems, such as by intermediary server systems for use by client computing systems ("clients") that are located near, or otherwise associated with, the intermediary servers. When a client submits a request for data (e.g., a Web page), the request may be routed to an intermediary server system that caches the requested data, which may then provide the cached data to the client. If the cached data has expired, the intermediary server may instead retrieve a current version of the data from a remote content data source and serves the current data to the client. However, various problems exist with such techniques.

DETAILED DESCRIPTION

Techniques are described for managing cached data for computing systems. In at least some embodiments, the data to be cached may be communicated between multiple computing systems over one or more networks using a defined transport protocol, such as by using the HyperText Transfer Protocol ("HTTP"), or instead using a different transport protocol (e.g., the File Transfer Protocol ("FTP") or the SPDY protocol). As one illustrative example, one or more HTTP-based Web server programs may provide HTTP-based content (e.g., Web pages, streaming audio and/or video, downloaded files, etc.) to one or more HTTP-based Web browser client programs, such as for display or other presentation to users of those Web browser programs. In such situations, various types of computing systems may cache HTTP-based content or other data on a temporary basis, such as on persistent storage. For example, in some situations, a client computing system may cache some such received data on persistent storage, such as to enable later use of that cached data by a client program executing on the client computing system. In addition, in some situations, one or more types of intermediary server systems may cache at least some such data on persistent storage, such as to enable such cached data to later be provided to one or more client systems—illustrative examples of such intermediary server systems include edge servers of a content delivery network, a proxy server that supports a group of client systems, etc. When a copy of a group of data (e.g., a file, a Web page, a data object, one or more database records, etc.) is cached on a computing system, however, a separate copy of that group of data (e.g., an original or current copy) on a different computing system may be subsequently changed in one or more manners, causing the cached copy to no longer accurately reflect a current state of that separate copy.

The described techniques for managing cached data for computing systems include updating a cached copy of a data group whose original copy (or other separate copy) has changed, without sending a new full version of the original copy to the persistent storage cache that holds the cached copy. Instead, in at least some embodiments and situations, a data source system that provides the original copy and a separate system that maintains the persistent storage cache interoperate to use only a subset of the data from such a changed original copy to modify the cached copy, so that the modified cached copy matches the changed original copy (or instead is modified to have some other defined state of interest). For example, in at least some such embodiments, one or more software modules of a data manager cache system on the data source system interact with one or more software modules of the data manager cache system on the separate system that has the persistent storage cache in a cooperative manner, such as by using a modified version of the HTTP transport protocol or other protocol that is supported by the data manager cache system—such interactions between the data source system and the separate system may enable differences between the cached copy and the original copy to be automatically identified and provided from the data source system to the separate system, optionally along with instructions of how to apply or otherwise implement the identified differences to the cached copy of the data group to modify it. The data manager cache system may have various forms in various embodiments, including in some embodiments to be integrated with a particular HTTP-based data server program (e.g., a Web server program) on the data source system and/or with a particular HTTP-based data client program on the separate system that has the persistent storage cache. Use of the described techniques provides various benefits, including to speed up the updating of changed content in such a persistent storage cache, with additional details related to the described techniques being included below. Thus, in at least some embodiments, some or all of the described techniques are automatically performed by embodiments of a data manager cache system, such as may be implemented by one or more software modules executing on one or more configured computing systems, to provide various types of benefits.

Thus, in a network-based environment (e.g., based upon the Internet), data may be cached for a period of time at intermediate server systems (e.g., edge servers) placed at various nodes of a network, such as a content delivery network (CDN). When a client requests a data group that is cached at an intermediary server and that is determined to be invalid (e.g., expired), the edge server may check with a content data source system in order to determine whether any changes to an original copy of the data group have occurred relative to the cached version (copy) of the data group. If any changes between the cached and current data groups are identified, the identified changes may be provided to the intermediary server system, in one example, along with instructions as to how to apply the identified changes to the cached version of the data group in order to bring the cached version of the data group into conformity with the current version of the data group. The identified differences may be incorporated into the cached data group according to the received instructions, and thus the modified cached data group may be returned to the client in response to the client request.

In a network environment, standard request-response interactions between the client, intermediary server, and the content data source may be facilitated by a transport protocol such as, for example, HTTP. In some embodiments and situations, a standard transport protocol response to the intermediary server's request may be modified to include the identified differences and/or associated instructions described above. For example, in an HTTP-facilitated communication, a validating request for content (a "GET" request) generated by an intermediary server may include an "If Modified Since" request for use in determining whether any modifications have occurred in the original data group since a date specified in the GET request. In response to the GET request, the differences between the expired cached data group and the current copy of the original data group stored with the content data source may be determined, using, for example, a file comparison utility, such as DIFF, or instead in other manners (e.g., by tracking changes that are performed to the original data group after the cached copy of the data group is created or last updated). If differences are identified, the HTTP protocol may be modified to enable a response that includes the identified differences. Specifically, a standard response having a status code 304 (Not Modified) may in some embodiments be modified to include the identified differences between the expired cached data group and the corresponding data group stored at the content data source, as well as associated instructions specifying the changed place in the object and a manner in which the differences may be applied. For example, the instructions may include adding, deleting, inserting, and/or executing data comprising identified differences at specified places in the cached data group. In other embodiments, rather than modifying an existing transport protocol response to support the described techniques, a new transport protocol or other interaction method may be implemented that supports the same types of functionality as are described above.

All entities participating in the above communication may support such cooperative interactions in order to produce (by a sending entity) and process (by a receiving entity) a modified response (e.g., a "modified 304" response in HTTP environment) containing the differences between the expired cached data group and the corresponding data group. Accordingly, one or more content data source systems may be enabled to produce a modified response, and one or more intermediary servers or other systems with maintained data caches may be enabled to process the received modified response in order to apply the identified data differences to the cached data group.

Tracking changes between a cached data group and the corresponding data group stored at a content data source may be done in a number of different ways. In addition to determining changes in the original data group based on time (e.g., determining changes occurred since the expiration of the cached data group), the changes may be tracked via entity identifiers, such as HTTP-based entity tags ("ETags") or other tags assigned to a specific copy of a data group, optionally to represent a particular version of that data group.

For illustrative purposes, some embodiments are described below in which specific instances of data cache management are provided in specific ways and with respect to specific types of client systems, specific types of data, and specific types of minimum functionality levels that are supported. These examples are provided for illustrative purposes and are simplified for the sake of brevity. The described techniques are not limited to use with particular types of data, storage or other devices, computing systems or computing system arrangements.

Figure 1:
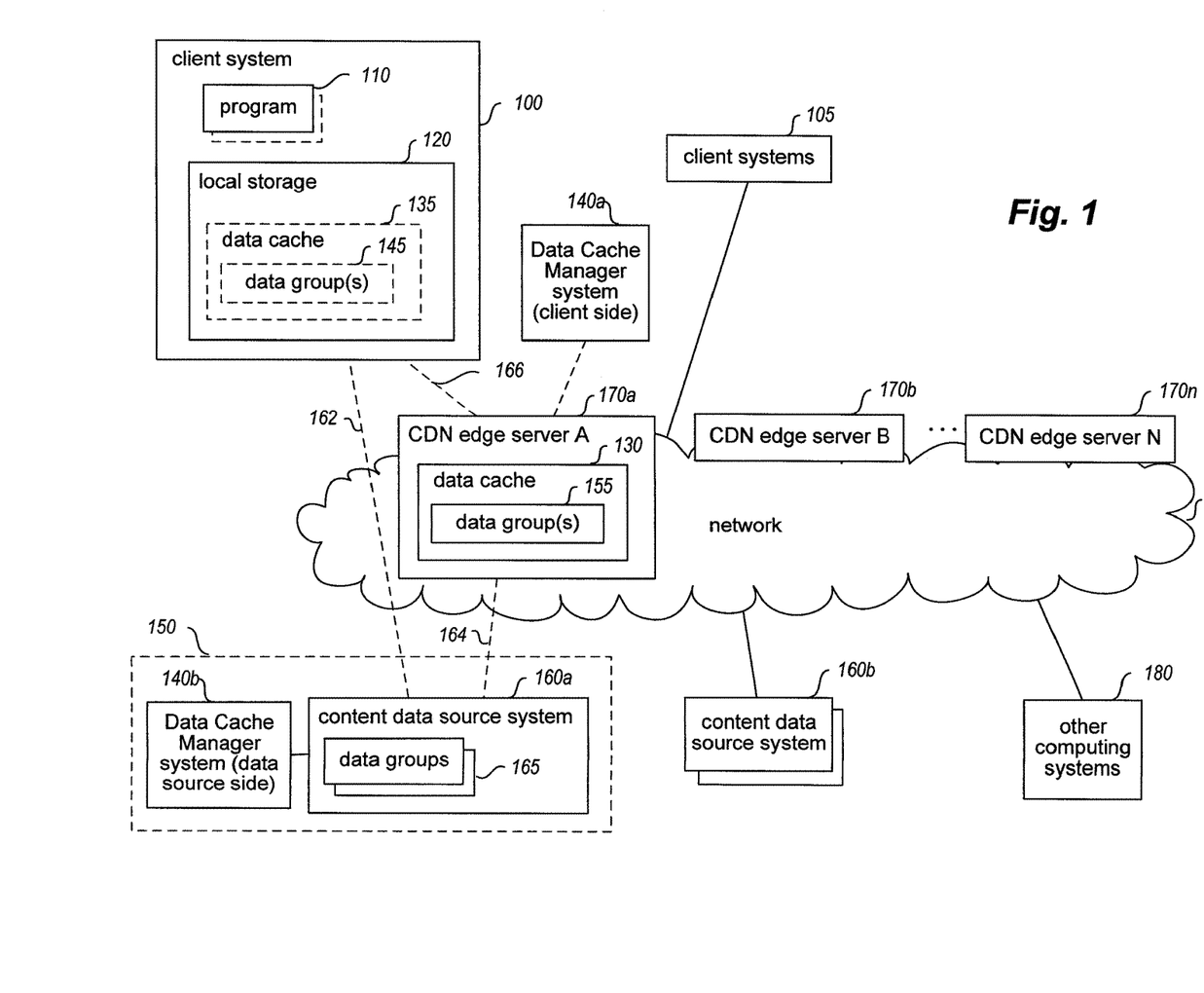
FIG. 1 illustrates an example embodiment of a data cache manager system that manages caching of data for supported client computing systems.

FIG. 1 is a network diagram that illustrates an example embodiment of a data cache manager system that manages caching of data for supported client computing systems in a network environment. An example of a network environment may be a content delivery network ("CDN") illustrated in FIG. 1. A CDN may include multiple edge server devices 170 that are located in different portions of one or more networks, and are able to each cache various data for use by clients that are near the edge server device or otherwise associated with the edge server device, and, if so, a particular edge server device may be selected and loaded with particular data groups for a particular client system in at least some embodiments and situations. The selection of a particular edge server device or other proximate device may be performed in various manners in various embodiments, including in a manner specific to a client system and/or a user of the client system based on current and/or predicted information about the client system and/or user (e.g., geographic location, network location, data connection bandwidth, data connection availability, local storage capacity, persistent cache capacity, etc.). Non-exclusive examples of content delivery networks include Akamai Technologies®, Amazon CloudFront®, BitTorrent®, CloudFlare®, Limelight Networks®, and PeerCast® and can be provided using various content networking technologies.

In particular, in the illustrated embodiment, a data cache manager system 140 performs automated operations to support the providing of information based on updating cache data stored at data cache 130 to one or more example client computing systems 100 and 105, with the data cache manager system 140 including a client-side portion 140a that is integrated with or otherwise supports the CDN edge server A, and including a data-source-side portion 140b that is integrated with or otherwise supports a content data source system 160a. While not illustrated in the example of FIG. 1, the client-side portion 140a may also be integrated with one or more client computing systems (e.g., with client system 100 to support an optional persistent data cache 135 of that client system), and/or such client computing systems may instead each execute a separate copy (not shown) of the client-side portion 140a to manage any such data caches that they use. In addition, one or more content data source systems 160 are available to provide various data to client systems, including multiple data groups 165 provided by the example content data source system 160a. Various CDN edge server devices 170a-170n are also illustrated at different locations within a network 190, and one or more other computing systems 180 are also illustrated and may be configured to provide various additional types of functionality (e.g., to manage operations of a network of the edge server devices 170 of the content delivery network).

In the illustrated example, the data cache manager system 140 may be integrated, as part of a system 150, with a content data source system 160a, to support operations of that content data source system, and with an edge server device 170 to support operations related to data cache management on the server side. As shown in FIG. 1, the data cache manager may be distributed in at least two modules 140a and 140b that interact in a cooperative manner, one module performing operations on the content data source, and another module performing operations on the intermediary server side (e.g., edge server device 170).

In other embodiments the data cache manager system 140 may execute on one or more computing systems that are separate from any such content data source systems 160, including to optionally support one or more such separate content data source systems. In yet other embodiments, the data cache manager system 140 may instead be integrated as part of the content delivery network to support its operations, as part of one or more client systems 100 and/or 105 to support their operations, as part of a remote component that is part of or otherwise supports a program 110 executing on one or more client systems (e.g., as part of a server-side portion of a Web browser program that includes client-side portions on the one or more client systems), etc.

In the illustrated example, the client system 100 is executing one or more programs 110, such as a Web browser program and/or another type of program. The client system 100 in this example further includes one or more local storage devices that provide local storage 120 for the client system 100. A portion of the local storage 120 may be optionally used in this embodiment to provide one or more persistent data caches 135, and to optionally store other data groups 145 (e.g., to store Web pages and other data objects that are currently or previously in use by the programs 110). It will be appreciated that the client computing system 100 may include various other components that are not illustrated in FIG. 1 for the sake of brevity. The client system 100 is discussed in greater detail with respect to FIG. 3 and elsewhere.

In the illustrated embodiment, a request for information (e.g., a data group) from a program 110 on the client computing system 100 to the intermediary server, e.g., edge server device 170 may be initiated. Information, such as a data group that may be requested by a client computing system may be comprised of multiple data groups. Non-illustrative examples of data groups may include, but are not limited to, particular files, Web pages, database rows or other records, and the like.

In some embodiments, particular data groups may be stored on one or more devices proximate to the client system, whether instead of or in addition to storing those data groups on a local persistent cache or other local storage of the client system. A proximate device may be near to a client system in one or more manners, such as in a geographic sense (e.g., to be near the client system in the physical world, such as to be located in the same building, multi-block area, city, zip code, state, country, etc.), and/or in a network sense. For example, the data groups may be stored so as to be near the client system within one or more networks, such as to be on the same network or sub-network, for example, at a storage associated with an edge server device for a content delivery network as illustrated in FIG. 1.

In response to the request for information received from the client system 100, an intermediary server, such as the server device 170, may initiate its own request to the data cache manager system 140 associated with the content data source system 160. A request may include a request to provide certain information related to a data group for the client computing system 100. A request to the data cache manager system may be initiated, for example, when the requested data group cached at the server device 170 has expired. In this example, the request may include a request to obtain information about the differences between the data group cached in the data cache 130 associated with the server device 170 and a current version of the data group stored with the content data source system 160 as one or more data groups 165.

After the data cache manager system 140 identifies the differences (if any) between the cached data group stored in the data cache 130 and the data group stored at the content data source system 160, the data cache manager system may initiate a response to the server device 170 in accordance with a transport protocol facilitating interactions between the client system 100, the server device 170, and the content data source system 160. As discussed above, one example of such transport protocol is HTTP. A standard response provided according to the transport protocol may be modified to include information about the identified differences (e.g., changes occurred on a requested Web page after the cached Web page has expired) and instructions related to a modification of the cached data group using the identified differences. Identified differences may include, but are not limited to, changes in content of the data group and/or changes in metadata associated with the data group (e.g., a header of a file, Digital Rights Management (DRM) information or other security-related or access-related information for the data group, etc.). In some embodiments, the data groups comprising the requested data group may be selected from multiple distinct content data source systems 160, or alternatively the data cache manager system 140 may directly store at least some of the data groups.

In addition, in some embodiments, the described techniques may further use one or more edge server devices 170 to assist the caching of data for particular supported client computing systems. In particular, as discussed in greater detail elsewhere, such edge server devices may be located at different locations in network 190, and may each store at least some available data groups to assist in providing data groups to particular clients (e.g., to proximate client computing systems) as appropriate. Thus, in some embodiments and situations, the client computing system 100 may have previously been interacting with a particular edge server device, such as edge server device A 170*a* in the illustrated example.

In these situations, the data cache manager system 140 may perform interactions to cause selected data groups to be loaded onto one or more particular edge server devices to facilitate access of those selected data groups to particular client computing systems. In particular, in this example, the system 140 may initiate one or more interactions 164 to cause particular data groups 155 (e.g., some or all of the data groups 165) to be stored on the edge server A device to assist in supporting client computing system 100, with data groups 155 optionally having an overlap with the selected data groups to be cached to the data cache 130 (e.g., to be a superset of the selected data groups, to be a subset of the selected data groups, etc.).

In some situations, the client system 100 may request a data group directly from the content data source system 160 via interactions 162. If the edge server device A is in use by the client computing system, the system 140 may further initiate one or more additional interactions 166 between the client computing system 100 and the edge server device A to cause some or all of the selected data groups to be cached in the data cache 130 from the edge server A device.

In embodiments in which edge server devices are in use, one or more of the other client computing systems 105 may be interacting with other edge server devices e.g., with a distinct edge server device B 170*b*.

A particular content data source system 160 may have various forms and may store various types of data in various embodiments. For example, a particular content data source system 160 may be a server computing system that executes one or more software programs (not shown) to manage access to available data groups, such as a Web server program to provide access to Web pages and other data to support one or more Web sites. Alternatively, a particular content data source system 160 may in some situations be a network storage device that stores data for access by other programs executing on other computing systems, such as to store various audio/video files that include digital media content.

Client computing systems may also have various forms in various embodiments, including desktop or other fixed-location computers, laptops and tablets and other mobile computers, smart phones and other cell phones, PDAs and other electronic organizers, Internet appliances, portable or fixed-location gaming systems, television-based systems (e.g., using set-top boxes and/or personal/digital video recorders), and various other consumer products that include appropriate communication capabilities.

Storage mechanism types for a client computing system and/or for a server device include at least a portion of a local non-volatile storage device, such as a portion of the local storage device that may optionally be dedicated for use as a storage cache for a particular software program executing on the client computing system or a server device and/or for a particular user of one or more software programs executing on the client computing system. As a second example, at least a portion of a distributed file system may be used as a storage mechanism. In some embodiments, other types of storage mechanism types local to a client computing system may be used, including a virtual local block storage device that is mounted to the client computing system or a server device or is otherwise accessible as a local storage device, but whose data is stored at least in part on one or more remote systems.

The use of particular data groups by a program 110 may be initiated in various manners in various embodiments and situations. For example, in some cases an application program 110 may have one or more users, and may request data groups in response to user interactions with the application program, including in situations in which the application program provides a publicly accessible service to such users. Such users may, for example, be local to the client system 100 (e.g., to interact with I/O devices, not shown, of the client system 100), and/or may be remote from the client system 100 (e.g., may use other computing systems 180 to interact with the program 110 over the network(s) 190). In addition, the data groups that are accessed, stored and used may have various forms in various embodiments and situations, including particular files, Web pages, data objects, database rows or other records, etc. The network(s) 190 of FIG. 1 may include any appropriate network or combination of networks, including an intranet, the Internet, one or more private networks with access to and/or from the Internet, a cellular network, a local area network, or any other such network or combination thereof. Communication over the networks may be enabled by wired or wireless connections and combinations thereof.

In other embodiments, the data cache manager system 140 may perform additional techniques, such as to further facilitate access of the cached data groups for a program 110 by retrieving and providing requested data groups to the program 110. In addition, the data cache manager system 140 may include software instructions that execute on one or more server computing systems to program or otherwise configure the server computing system(s) to perform some or all of the described techniques, such as to program one or more hardware CPU processors (not shown) of the server computing system(s).

Although the foregoing example embodiment of FIG. 1 is described with respect to a data cache manager system that provides various types of functionality for an associated content data source system and edge server device in conjunction with one or more client systems that each may have one or more users, it will be appreciated that various other embodiments may exist.

As described above, the functionality provided by the data cache manager system includes determining differences between a cached version of the data group stored at an intermediary server and a current version of the data group stored at a content data source system. The differences between a cached copy of a data group and a current version of the data group stored at a content data source may take different forms. Suppose a data group comprises a Web page provided by a content data source system. A copy of the page may be cached at an intermediary server for a period of time (TTL). When a client requests the Web page, the intermediary server determines that the cached copy is expired (TTL has run out) and sends a request to the content data source. The data cache manager associated with the content data source system may determine that during the period of time since expiration of TTL one or more changes to the content comprising the current version of the Web page have occurred. For example, a portion of new content (e.g., an advertisement, a picture, a portion of text) may have been inserted into the original page at a particular place, a portion of new content may have replaced an old portion of content at a particular place in the page, a particular portion of old content may have been deleted and/or replaced, and the like.

The data cache manager may also determine instructions as to how to apply the identified differences in order to modify the cached data group such that the cached object matches the original copy stored at the content data source system. For example, if a new portion of content is to be added to the cached Web page in order to match the original copy, the instructions may direct the intermediary server to add the portion of content at a specified place in the page. Similarly, the instructions may include deleting and/or inserting portions of content from or into the cached page.

In another example, an identified difference may comprise a portion of executable code (script, applet, or the like) that, when executed on the cached page, will bring the cached page in conformity with the current version of the page stored at the content data source system. The code may be provided with the data cache manager's response to the intermediary server for execution on the cached page. Alternatively, a portion of executable code may have already been stored at the intermediary server. In this case, the data cache manager's response to the intermediary server may include instructions to execute the previously stored code on the cached page. The response may also include one or more parameters or other data to apply to the stored code for execution. In one example, the provided or stored code, when executing on the cached page, may initiate additional interactions with the content data source system and/or other remote systems if needed.

In another example, the code previously stored for execution may have its own TTL that may be the same or different than the TTL associated with the Web page. For example, the code, when executed, may apply a "watermark" to particular images sent to and displayed on a Web page, such as a watermark that is supposed to change periodically, e.g., every hour. In this case, the code's own TTL is one hour, which means that every hour a new portion of executable code that produces a new watermark may be sent by the data cache manager to the intermediary server to execute on the cached copy of the page, such as to change content of the images and/or metadata associated with the images.

Generally, a data group (e.g., a Web page) may be compiled from different data sources and have different content elements sourced by different data sources. For example, a page may have one or more iFrames, each having a TTL that may be different than the TTL associated with the page. For example, an advertisement provided by a third-party data source may be required to change every 2 minutes, whereas a TTL for the cached page is 10 minutes. Each separate content element comprising the page may need to be updated according to its TTL. Accordingly, if an intermediary server having a cached version of the page receives a request for the page, the data cache manager will generate requests (in HTTP environment, GET requests) for those content elements whose TTLs have expired and send the generated requests to respective content data source systems.

In order to identify differences between the cached version of the data group and a current version of the data group, the data cache manager may be configured to track the changes occurring in the current version of the data group relative to the cached version of the data group. Tracking changes between the cached data group and corresponding data group stored at a content data source may be done in a number of different ways. In addition to determining changes in the original data group based on time (e.g., determining changes occurred since the expiration of the cached data group), the changes may be tracked via entity identifiers, such as entity tags assigned to a specific version of a data group.

For example, an entity tag (ETag) may be associated with a current version of a data group (e.g., a Web page). Any change in the data group (e.g., adding a portion of new content, removing a portion of old content, inserting new content, and the like) may cause a corresponding change in the associated tag. For example, a current version of a Web page may be associated with a tag "version 1.0." A change in the current version may cause the associated tag to change to "version 1.1." A change of the version 1.1 of the page may cause the associated tag to change to "version 1.2," and so on. Each tag may be temporarily stored with the associated version of the page. Alternatively, only changes that occurred from one version to another may be stored with an associated tag. Thus, the tags may be used to identify specific revisions of a data group (in our example, a Web page).

For example, a cached web page is a version 1.0 of the page with a corresponding tag. When a request for a page is received by an intermediary server, where the version 1.0 of the page is cached, the server may send a request (in HTTP environment, a GET request "if modified since 'version 1.0' ETag") to the content data source system to determine whether the current version of the page has the same "version 1.0" tag. If the current version of the page is associated with the tag "version 1.0", no changes in the page have occurred and a relevant response (in HTTP environment, a response with the status code 304 "No changes") will be sent in response to the request. If the current version of the page is associated with the tag other than "version 1.0" (e.g., with the tag "version 1.2"), the data cache manager will have to identify the differences between the version 1.2 and 1.0 and send the identified differences with the response (in HTTP environment, a modified 304 status code response). For example, if the difference between version 1.0 and version 1.1 is X, and the difference between version 1.1 and version 1.2 is Y, the difference between version 1.0 and version 1.2 may be identified as X+Y.

FIGS. 2A-2C and 2D-2F illustrate examples of managing cached data in accordance with some of the embodiments described above. The described examples do not limit the current disclosure and are merely illustrative. In the examples, it is assumed that a client system 100 provided a request for a data group to an intermediary server, such as the edge server 170 that has a cache storage capacity and caches data groups 150 comprising the requested data group.

Figure 2A:
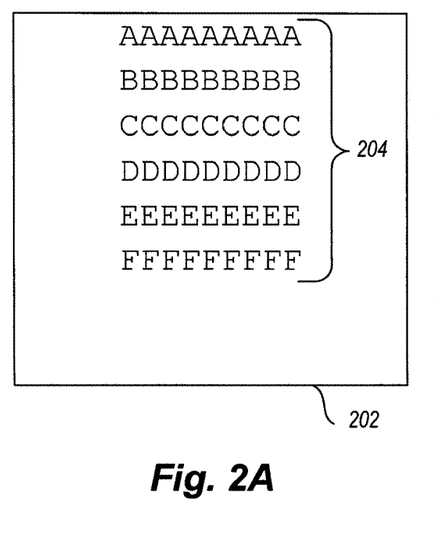
FIGS. 2A-2F illustrate examples of managing the caching of one or more data groups in particular manners in particular situations.
Figure 2B:
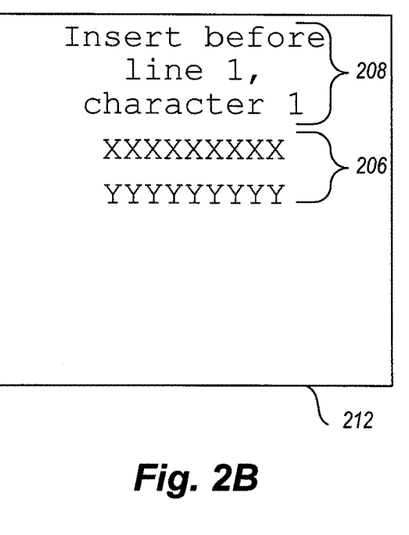
Figure 2C:
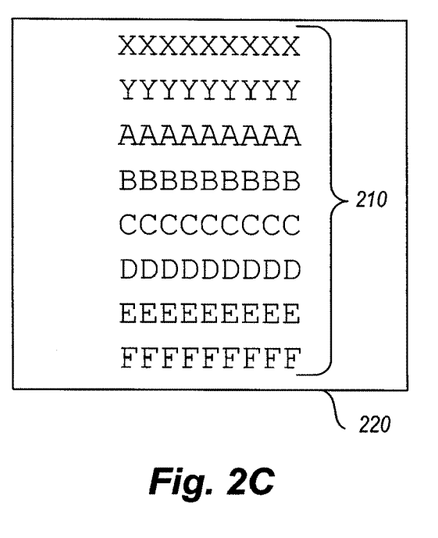

FIG. 2A illustrates a data group, such as a file (e.g., a Web page) 202, having a set of data elements (characters) 204 placed in multiple lines: AA . . . A, BB . . . B, CC . . . C, DD . . . D, EE . . . E, and FF . . . F. The file 202 may be cached at data cache storage 130. FIG. 2B illustrates an example modified response 212 produced by a data cache manager 140 in response to a request submitted by an intermediary server, such as a CDN edge server 170. The response 212 includes a determined difference between the cached data group 202 and an original data group (not shown) that is stored, for example, at a content data source system 160. As illustrated, the difference 206 comprises two lines of characters XX . . . X and YY . . . Y. The response 212 further includes instructions 208 as to how to use the determined difference 206: "insert before line 1, character 1" in the cached data group 202. FIG. 2C illustrates a resulting data group 222 modified according to the provided instructions 206. The resulting data group 222 includes the lines of characters 210. As illustrated, the determined difference 206 (XX . . . X, YY . . . Y) has been inserted before the first character A of the first line AA . . . A of the cached data group 202.

Figure 2D:
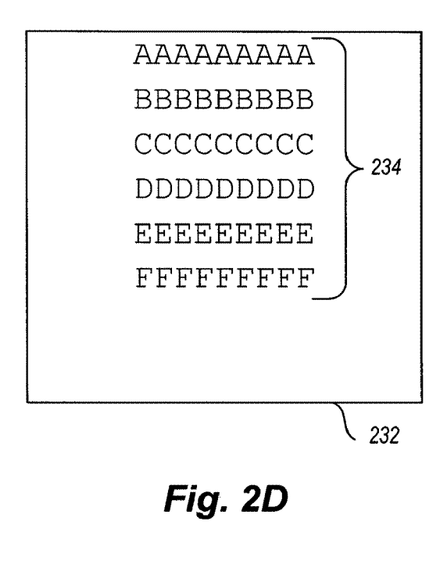
Figure 2E:
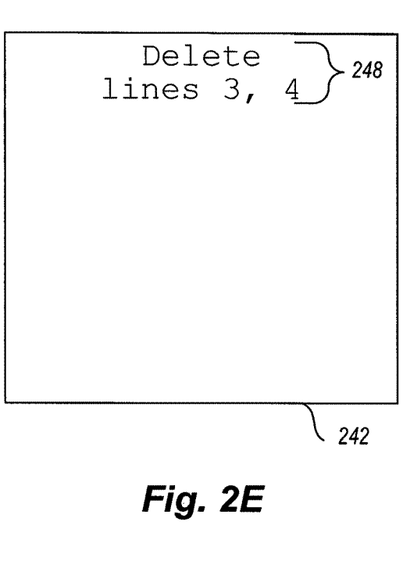
Figure 2F:
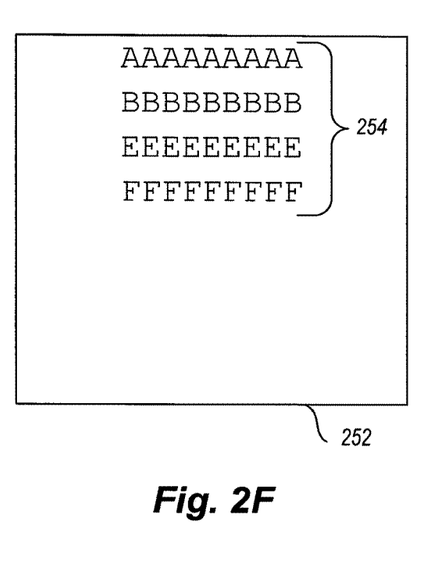

FIGS. 2D-2F illustrate another example of managing cached data in accordance with an embodiment. FIG. 2D is similar to FIG. 2A and illustrates a data group, such as a file (e.g., Web page 232), having a set of data elements (characters) 234 placed in multiple lines: AA . . . A, BB . . . B, CC . . . C, DD . . . D, EE . . . E, and FF . . . F. The page 232 may be cached at data cache storage 130. FIG. 2E illustrates an example modified response 242 produced by a data cache manager 140 in response to a request submitted by an intermediary server, such as a CDN edge server 170. The response 242 reflects a determined difference between the cached data group 232 and an original data group (not shown) that is stored, for example, at a content data source system 160. As illustrated, the response includes information 248 about a determined difference that includes two lines of characters CC . . . C and DD . . . D in this example, which correspond to lines 3 and 4 of the data group 232. The information 248 in the response in this example includes instructions as to how to use the determined difference to modify the cached data, which in this example indicates to "delete lines 3, 4" in the cached data group 232. FIG. 2F illustrates a resulting data group 252 modified according to the provided instructions. As illustrated, the determined difference (CC . . . C, DD . . . D) has been deleted from the cached data group 232, resulting in the data 252 comprising the data group 254 that may be provided to the client system in response to the request for the data group.

It will be appreciated that the examples of FIGS. 2A-2F are provided for illustrative purposes, and that the invention is not limited by the details discussed with respect to those examples.

Figure 3:
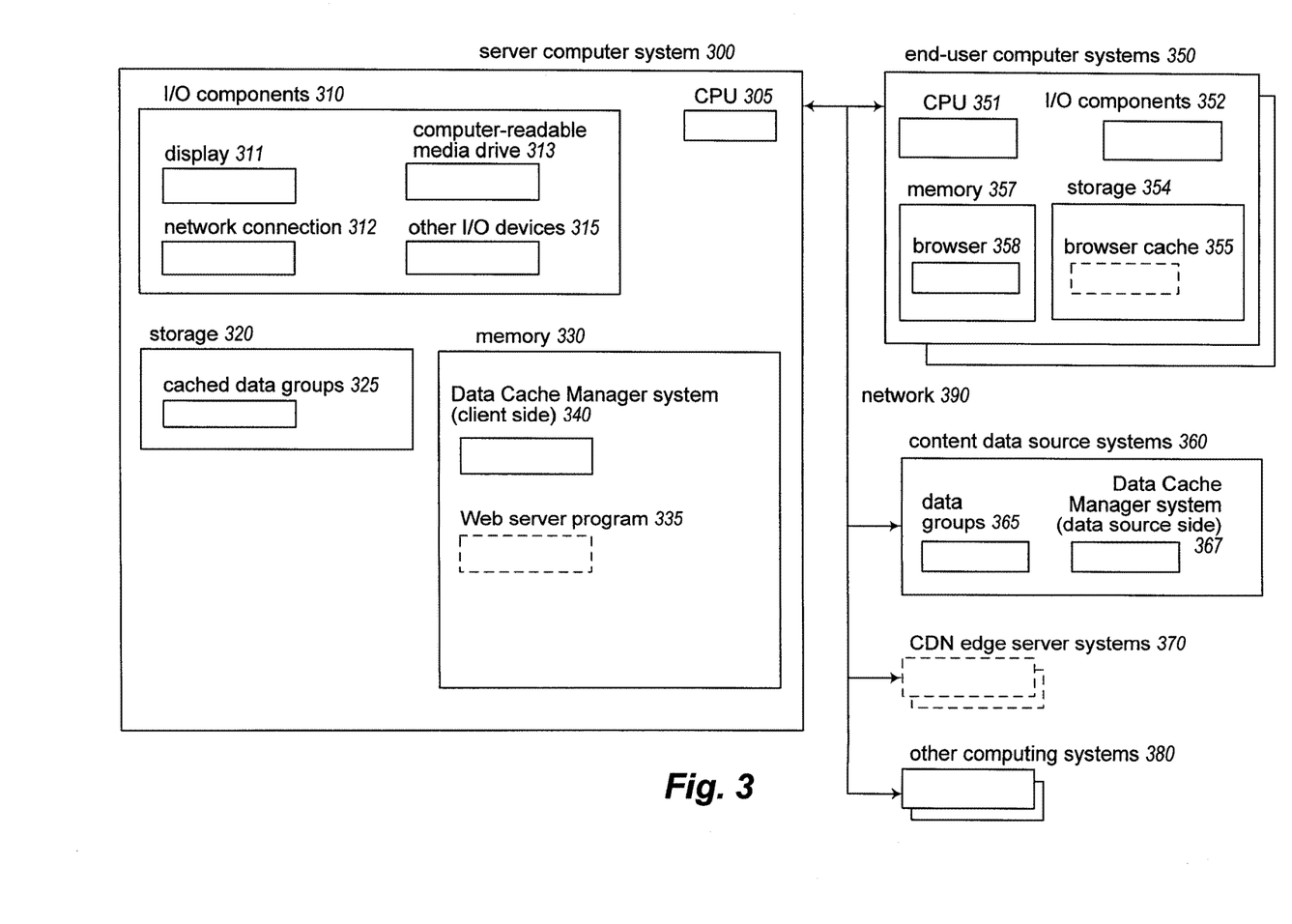
FIG. 3 is a block diagram illustrating an example embodiment of a computing system configured to provide a data cache manager system that manages caching of data for supported client systems.

FIG. 3 is a block diagram illustrating an example embodiment of a computing system suitable for performing techniques to manage the caching of data for supported client systems. In particular, FIG. 3 illustrates a server computer system 300 suitable for executing an embodiment of a data cache manager system 340, as well as various computer systems 350, content data source systems 360, optionally edge server devices 370, and other computing systems 380. In the illustrated embodiment, the computer system 300 has components that include one or more hardware CPU processors 305, various I/O components 310, storage 320, and memory 330, with the illustrated I/O components including a display 311, a network connection 312, a computer-readable media drive 313, and other I/O devices 315 (e.g., a keyboard, a mouse, speakers, etc.). In other embodiments, the computer system 300 may have more or less components than are illustrated, and the local storage 320 may optionally be provided by one or more non-volatile storage devices that are included within or otherwise locally attached to the computer system 300.

In addition, the illustrated client computer systems 350 have components similar to those of computer system 300, including a CPU 351, I/O components 352 (although particular components are not illustrated), storage 354, and memory 357. The other content data source systems 360, edge server devices 370, and other computing systems 380 may also each include similar components to some or all of the components illustrated with respect to computer system 300, but such components are not illustrated in this example for the sake of brevity. The client computer systems 350 each include one or more browser cache 355 portions of the local storage 354, and each includes a browser program 358 executing in memory 357, although in other embodiments one or both of these components may not be present on some or all client systems. Furthermore, a particular client computer system 350 may have more or less components than are illustrated, and the local storage 354 may optionally be provided by one or more non-volatile storage devices that are included within or otherwise locally attached to that client computer system 350.

An embodiment of a client-side portion of a data cache manager system 340 is executing in memory 330 of computer system 300, such as to include software instructions that, when executed by the CPU 305, program or otherwise configure the computer system 300 to perform automated operations to provide some or all of the described techniques—in particular, the client-side portion of the system 340 may perform automated operations to modify cached data groups 325 that are part of a persistent storage cache (not using) that is implemented on the intermediate server computer system 300 using at least a portion of storage 320. The automated operations of the client-side portion of the data cache manager system 340 may further include performing interactions with a data-source-side portion of the data cache manager system 367 that is executing in memory (not shown) on a particular content data source system 360, to identify differences between an original copy of a data group 365 provided by the content data source system 360, relative to a cached copy of that data group 365 amongst the cached data groups 325. In addition, an application program 335 is executing in memory 330 (which in this example embodiment is a Web server program), optionally in affiliation with (or integrated with) the system 340, although in other embodiments the system 340 may support one or more software programs and/or systems over the network 390 (e.g., one or more content data source systems 360 and/or one or more edge server devices 370), or instead the system 340 may operate independently of any such software programs and systems. In this example embodiment, the data cache manager system 340 includes functionality related to managing the caching of subsets of a plurality of data groups (not shown) for supported client systems, and is further optionally configured to interact with client computer systems 350 and/or other systems and devices over the network 390 (e.g., via the Internet and/or the World Wide Web, via a private cellular network, etc.). The other systems 350, 360, 370 and/or 380 may also each be executing software as part of interactions with the system 340.

Various additional information related to the operation of the data cache manager system 340 and/or application program 335 may be stored in storage 320, although particular such information is not illustrated in FIG. 3. Additional details regarding operations of the system 340 in particular embodiments are described in greater detail elsewhere.

It will be appreciated that systems 300, 350, 360, 370 and 380 are merely illustrative and are not intended to limit the scope of embodiments of the present disclosure. For example, system 340 may instead be executed by multiple interacting computing systems or devices, and computing system 300 may be connected to other devices that are not illustrated, including through one or more networks such as the Internet, via the World Wide Web ("Web"), or other electronic communications network (e.g., cellular based network, public switched telephone network). More generally, a computer system or computing system or other device may comprise any combination of hardware that can interact and perform the described types of functionality, optionally when programmed or otherwise configured by particular corresponding software instructions, including without limitation desktop or other fixed-location computers, laptops and tablets and other mobile computers, database servers, network storage devices and other network devices, PDAs, smart phones and other cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated system 340 may in some embodiments be distributed in various modules.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computer systems via inter-computer communication. Thus, in some embodiments, some or all of the described techniques may be performed by hardware means that include one or more processors and/or memory and/or storage when configured by one or more software programs (e.g., by the system 340) and/or data structures. Furthermore, in some embodiments, some or all of the systems and/or modules may be implemented or provided in other manners. For example, the systems and/or modules may be implemented by using means (e.g., specialized electronics) that are implemented at least partially or completely in firmware and/or hardware. These include, but are not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on non-transitory computer-readable storage media, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multi-plexed analog signal, or as multiple discrete digital packets or frames). Such computer program products may also take other forms in other embodiments. Accordingly, the present invention may be practiced with other computer system configurations.

Figure 4:
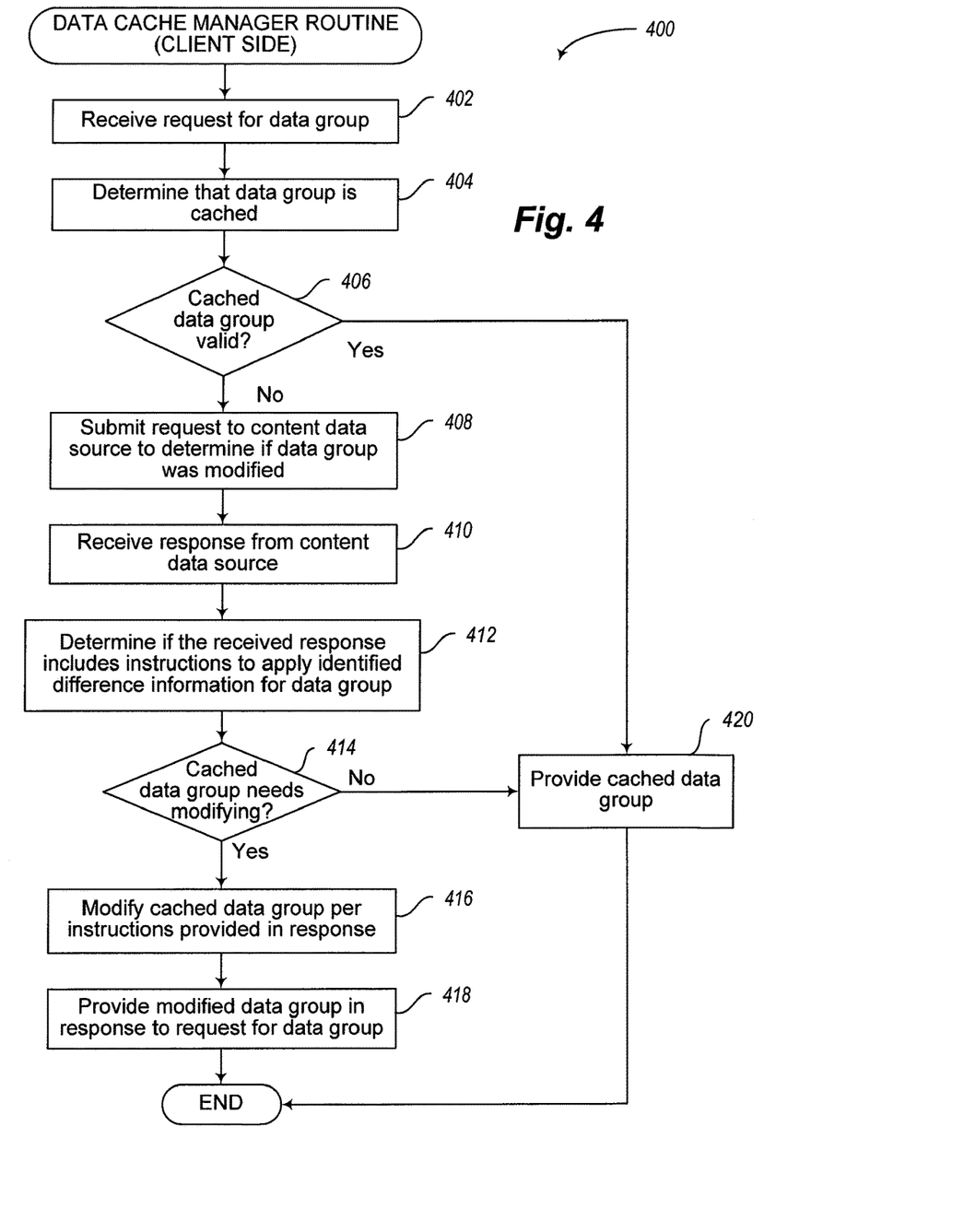
FIG. 4 illustrates an example flow diagram for a portion of a data cache manager routine that supports a system that caches data.

FIG. 4 is a process flow diagram illustrating an example embodiment of a routine 400 for a client-side portion of a data cache manager module, such as for a module operating on an intermediary server or other server that maintains a persistent storage cache. In this illustrated embodiment, the routine 400 performs data cache management activities aimed at modifying (if necessary) the cached data group stored on the server side and delivering the modified object to the client computing system that requested the data group. The routine 400 may be provided by, for example, execution of the data cache manager system 140a of FIG. 1, and/or the data cache manager system 340 of FIG. 3, such as to manage the caching of data to be delivered to client computing systems in defined manners, as well as to perform other types of actions in some situations.

In the illustrated embodiment, the process 400 begins at block 402, where a request for data groups comprising a data group is received from a client by an intermediary server (e.g., edge server 170). At block 404, it is determined that the requested data group is cached at the intermediary server. At decision block 406, it is determined whether the cached data group is valid. This determination may occur in a number of different ways. For example, it may be determined whether the "time to live" associated with the object has expired. In another example, the data cache manager may initiate a request to the content data source system in order to determine whether any changes on the current version of the data group stored at the content data source occurred relative to the cached version of the data group.

In one instance, the changes in the current version versus the cached version may be tracked using ETags as described above. In one embodiment, a request to determine whether any changes occurred in the current version of the data group may be submitted any time a request for a data group is received from the client. In this example, the actions associated with the decision block 406 may occur on the content data source side in response to the request to determine whether any changes occurred in the current version of the data group relative to the cached version. The request to identify the differences between the current and cached version of the data group is described below in reference to block 408.

If it is determined that the data group is valid, at block 420 the cached data group is provided to the client in response to the client request. If it is determined that the cached data group is not valid, at block 408 a request is submitted to the data source to determine whether the current version of the data group has been modified relative to the cached data group. At block 410, a response to the request is received from the data cache manager module associated with the content data source system. At block 412, the differences between the cached data group and the original data group are identified in the received response.

The instructions to use the identified difference in information may also be identified in the received response. At decision block 414, it is determined whether the cached data group needs modifying based on a determination made at block 412. If the data group does not need any modification (e.g., no changes in the current data group relative to the cached data group have been tracked as described above), at block 420 the cached data group is provided in response to the request. If the object needs modifying, at block 416 the data group is modified per instructions provided in the response. At block 418, the modified data group is provided to the client in response to the request. The process 400 then ends.

Figure 5:
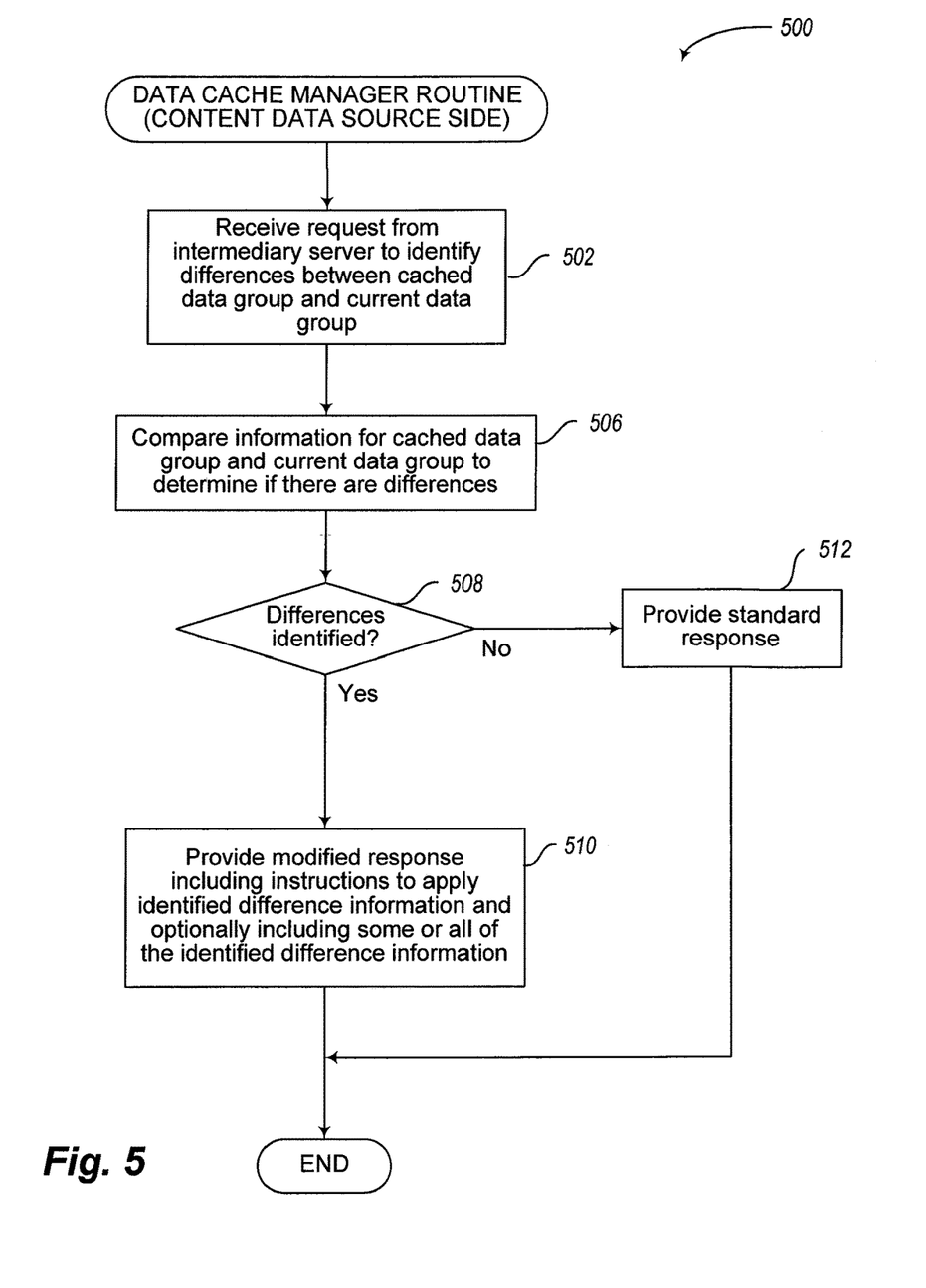
FIG. 5 illustrates an example flow diagram for a portion of a data cache manager routine that supports a data source system that provides data to other systems that may cache the data.

FIG. 5 is a process flow diagram illustrating an example embodiment of a routine 500 for a data-source-side portion of a data cache manager module operating on or in conjunction with the content data source system that provides data groups to others. In this illustrated embodiment, the routine 500 is configured, in response to a request from an intermediary server, to identify differences (if any) between the cached and current versions of the data group, forming a response to the request that is modified to include the identified differences and associated instructions as to how to apply the differences to the cached version of the data group, and to provide the modified response to the intermediary server. The routine 500 may be provided by, for example, execution of the data cache manager system 140b of FIG. 1, and/or the data cache manager system 367 of FIG. 3, such as to assist in managing the caching of data to be delivered to client computing systems in defined manners, as well as to perform other types of actions in some situations.

The process 500 begins at block 502, where a request from an intermediary server to identify differences between the cached data group and the current version of the data group is received. At block 506, the cached version of the data group and the current version of the data group are compared in order to determine whether there are differences between the cached data group and the original data group stored at the content data source. As described above, the differences may be identified in a number of ways, including tracking the changes in the copy of the data group stored at the content data source relative to the cached copy of the data group.

At decision block 508, it is determined whether any differences between the cached version of the data group and the current version of the data group stored at the content data source have been identified. As described above, the differences may include various types of changes that have occurred in the current version of the data group relative to the cached version of the data group. The differences may include, but are not limited to, portions of content to be deleted from, added to, or inserted into the cached version in order for the cached data group to conform to the current version. The differences may further include portions of code to be executed on the cached version of the data group in order to bring the cached data group into conformity with the current version of the data group stored at the content data source system.

If it is determined that no differences are identified, at block 512 a standard response to the request is provided to the intermediary server device. If it is determined that any differences have been identified, at block 510 a modified response is formed and includes identified data group difference information and instructions to use the identified data group difference information. The modified response is then provided to the intermediary server in response to the request described in reference to block 502. The process 500 then ends.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different manners in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium other aspects may likewise be so embodied.

What is claimed is:

1. A computer-implemented method comprising:
    determining, by a computing system that stores a cached copy of a group of executable code, and based on one or more defined criteria, that the cached copy has expired;
    interacting, by the computing system and in response to the determining, with a remote data source system that stores a separate copy of the group of executable code, including obtaining information about differences identified between the cached copy and the separate copy;
    modifying, by the computing system and based on the identified differences, the cached copy of the group of executable code to match the separate copy; and
    executing, by the computing system, the modified cached copy of the group of executable code, including performing additional interactions with one or more remote computing systems under control of the executing modified cached copy of the group of executable code.

2. The computer-implemented method of claim 1 wherein the one or more defined criteria indicate an expiration time, and wherein the determining that the cached copy has expired includes determining that a current time is after the expiration time.

3. The computer-implemented method of claim 1 wherein the one or more defined criteria are based at least in part on a tag associated with the cached copy that represents a version of the cached copy, and wherein the interacting with the remote data source system includes requesting the remote data source computing system to determine if a current version of the separate copy is different from the version represented by the associated tag.

4. The computer-implemented method of claim 1 wherein the separate copy of the group of executable copy is a current copy that is stored by the remote data source system, and wherein the interacting with the remote data source system includes requesting the remote data source system to determine if the current copy has changed since a prior time when the cached copy was previously provided to the computing system.

5. The computer-implemented method of claim 1 wherein the interacting with the remote data source system includes making a request to the remote data source system for a current version of the separate copy if the separate copy has been modified since a prior time corresponding to when the cached copy was previously provided to the computing system, and obtaining a response from the remote data source system that has associated instructions related to the differences, and wherein the method further comprises using, by the computing system, the associated instructions for the modifying.

6. The computer-implemented method of claim 1 wherein the executing of the modified cached copy of the group of executable code further includes causing modifications to a group of data stored on cache storage of the computing system.

7. The computer-implemented method of claim 1 wherein the executing of the modified cached copy of the group of executable code further includes updating stored data, and providing the updated stored data for display.

8. The computer-implemented method of claim 1 wherein the modifying of the cached copy includes at least one of adding at least some of the obtained information to the cached copy or of replacing data within the cached copy with at least some of the obtained information.

9. The computer-implemented method of claim 1 wherein the modifying of the cached copy includes updating a version of the group of executable code.

10. The computer-implemented method of claim 1 wherein the modifying of the cached copy includes modifying metadata associated with the cached copy.

11. The computer-implemented method of claim 1 further comprising obtaining, by the computing system, a request from a client system for the group of executable code, wherein the determining that the cached copy has expired is performed as part of responding to the received request, and wherein the method further comprises providing, by the computing system, the modified cached copy to the client system in response to the received request.

12. The computer-implemented method of claim 11 further comprising, before the obtaining of the request from the client system:
    obtaining a prior request for indicated information that includes at least one of a file, one or more database records, a group of streaming media data, a data object, or a Web page;
    obtaining the group of executable code from the remote data source system in response to a data request sent by the computing system;
    sending the indicated information to a requester in response to the received prior request; and
    storing the received group of executable code in cache storage on the computing system as the cached copy.

13. A non-transitory computer-readable medium including stored contents that cause a data source system to perform automated operations including at least:
    obtaining, by the data source system, and from a remote computing system that stores a cached copy of a group of executable code, a request associated with updating the cached copy of the group of executable code;
    identifying, by the data source system, differences between a current copy of the group of executable code and the cached copy of the group of executable code;
    determining, by the data source system, instructions that, when executed by the remote computing system, perform one or more actions for modifying the cached copy of the group of executable code stored on the remote computing system to include the identified differences; and
    providing, by the data source system and to the remote computing system, a response that is to the request and that includes the instructions, to initiate the modifying of the cached copy of the group of executable code to include the identified differences.

14. The non-transitory computer-readable medium of claim 13 wherein the providing of the response further causes, under control of the remote computing system, obtaining the provided response with the instructions, executing the instructions to cause the modifying of the cached copy of the group of executable code, and executing the modified cached copy of the group of executable code.

15. The non-transitory computer-readable medium of claim 13 wherein the instructions include information for use in executing software code on the remote computing system.

16. The non-transitory computer-readable medium of claim 13 wherein the stored contents include software instructions that, when executed by the data source system, further cause the data source system to determine that the cached copy is not valid relative to the current copy by performing at least one of comparing times associated with the cached copy and the current copy, comparing tags associated with the cached copy and the current copy, comparing versions associated with the cached copy and the current copy, or comparing at least portions of the cached copy and the current copy.

17. A computer system, comprising:
    one or more hardware processors;
    storage; and
    one or more memories with stored instructions that, when executed by at least one of the one or more hardware processors, cause the computer system to perform operations including at least:
    determining, for a cached copy of a group of executable code stored in the storage, that the cached copy does not satisfy one or more defined criteria;
    interacting with a remote computing system to obtain information corresponding to one or more actions for modifying the cached copy of the group of executable code to include identified differences between the cached copy and a separate copy of the group of executable code; and
    performing the one or more actions to modify the cached copy of the group of executable code to include the identified differences, to enable execution of the modified cached copy.

18. The computer system of claim 17 wherein the interacting with the remote computing system further includes obtaining instructions to execute, wherein the performing of the one or more actions includes executing the received instructions, and wherein the operations further include obtaining a request from a client system for the group of executable code, and providing the modified cached copy of the requested group of executable code to the client system in response to the request.

19. The computer system of claim 17 wherein the computer system is a client system further comprising a presentation program that, when executed by at least one of the one or more hardware processors, presents the modified cached copy of the group of executable code to a user on one or more output devices of the computer system.

* * * * *